Dec. 10, 1957 R. E. GARWOOD Re. 24,400
ADJUSTABLE BREAK-THROUGH TORQUE WRENCH
Original Filed Feb. 12, 1951
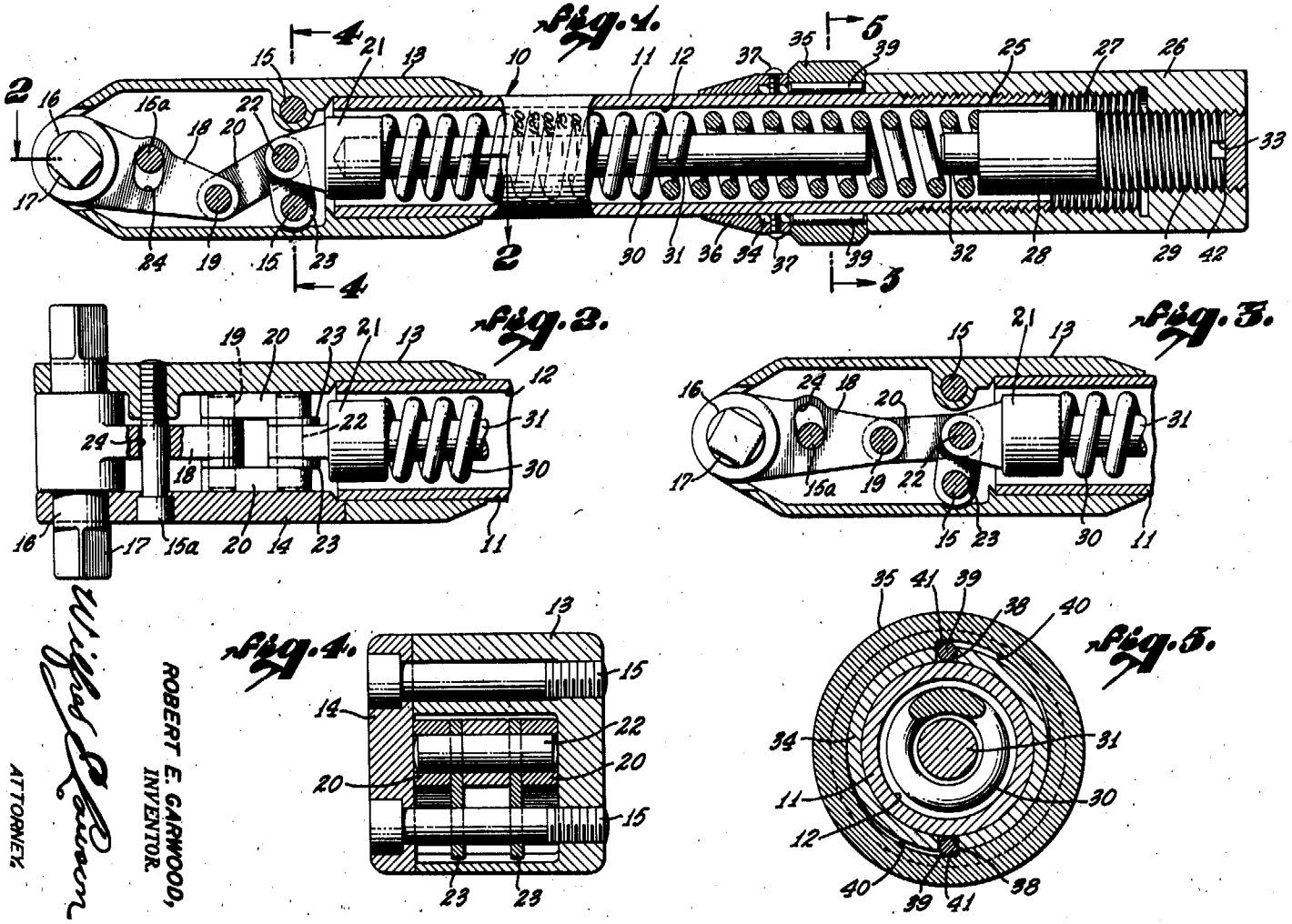
ROBERT E. GARWOOD,
INVENTOR.
Wilfred E. Lawson
ATTORNEY.

United States Patent Office

Re. 24,400
Reissued Dec. 10, 1957

24,400

ADJUSTABLE BREAK-THROUGH TORQUE WRENCH

Robert E. Garwood, San Gabriel, Calif., assignor to George C. Jenkins, doing business as Skyway Precision Tool Company, Los Angeles, Calif.

Original No. 2,667,800, dated February 2, 1954, Serial No. 210,557, February 12, 1951. Application for reissue January 30, 1956, Serial No. 562,375

11 Claims. (Cl. 81—52.4)

Matter enclosed in heavy brackets [ ] appears in the original patent but forms no part of this reissue specification; matter printed in italics indicates the additions made by reissue.

This invention relates to machinery and tools and more especially to a wrench of the limited torque type.

An object of the invention is to provide novel improvements in a wrench of the limited torque type.

Another object of the invention is to provide a torque wrench of improved type wherein a predetermined torque can be readily determined in use.

An additional object of the invention is to provide a novel torque wrench wherein the limit of desired torque can be readily indicated and the tool adapted for adjustment to varying amounts of predetermined torque values.

Another object of the invention is to provide a torque wrench of novel construction of the break through type that is adjustable as to break through torque values and is adjustable as to a plurality of such values and having features for locking adjustment against accidental shifting.

Other objects and advantages will appear and be brought out more fully in the following specification, reference being had to the accompanying drawing.

In the drawing:

Figure 1 is a longitudinal sectional view of an embodiment of the present invention.

Figure 2 is a sectional view taken along the line 2—2 of Figure 1.

Figure 3 is a partial view in section showing the toggle link features seen in Figure 1, shown in position after operation.

Figure 4 is a sectional view taken along the line 4—4 of Figure 1.

Figure 5 is a sectional view taken along the line 5—5 of Figure 1.

In the drawing the numeral 10 designates generally a wrench of limited torque embodying the present invention and comprising a tubular body and handle member 11 formed with a bore 12, open at both ends. A shell 13 is suitably secured to body member 11 at one end and is provided with a side plate 14 secured to the shell by a plurality of bolts 15.

Shell 13 and plate 14 provide bearings for a spindle 16 having square ends 17 for engaging the sockets of socket wrench elements, a lever arm 18 being integral with spindle 16 and having a pivot connection 19 to one end of a link 20. A cylindrical element 21 has a pivot connection 22 to link 20 and a link 23 is connected between the pin of pivot 22 and one of the shell bolts 15. Lever arm 18 is formed with a slot 24 through which extends one of the shell cover bolts 15a, which serves to limit the movement of the lever arm.

Member 11 has a threaded end portion 25 and a sleeve member 26 has a threaded bore portion 27 engageable with threads 25 of member 11. Sleeve 26 has a threaded reduced bore 42 and a cylindrical spring seat element 28 has a threaded end portion 29 engaging in threaded portion 42 of the sleeve. A compression spring 30 is positioned in bore 12 and seats against seat element 28 and cylindrical element 21, a guide stem 31 for the spring being secured to element 21 if desired. Element 28 may have a similar spring guide stem 32 if desired. Seat element 28 is formed with a screw driver slot 33 to permit longitudinal adjustment of element 28 in the sleeve.

Sleeve 26 has a tubular end portion 34 into which extends a portion of body member 11, the outer diameter of which portion 34 is reduced and a cam collar 35 is rotatable on this reduced portion. A holding collar 36 for cam collar 35 is secured on end portion 34 as by screws 37. Portion 34 is formed with a pair of longitudinal slots 38 in each of which is positioned a bearing roller 39 and sleeve 35 is formed with cam surfaces 40 of graduated diameters and is also formed with shoulders 41 for engaging rollers 39. Thus when collar 35 is rotated to the left as seen in Figure 5 cam surfaces 40 will engage rollers 39 and cause a locking engagement of the rollers with body member 11 and prevent a rotation of sleeve 26 on body member 11. Conversely when collar 35 after being thus locked is rotated to the right to the position as seen in Figure 5, the locking engagement is released and the sleeve 26 can be turned so as to either increase or decrease the compression of spring 30 in its engagement with element 21. Collar 36 may be provided with scale indicia or other marking which will indicate the actual torque which the wrench will apply before operation of the toggle joint. In order to change the initial settings of this torque, seat element 28 may be adjustably positioned in sleeve 26 by use of the screw driver slot 33 as will be obvious.

In the operation of the invention a wrench socket element or other tool may be connected to the lower end 17 of spindle 16, for example, and upon right hand rotation of the wrench as seen in Figure 2, a torque will be applied to the connected tool and upon the limit of torque being reached as determined by the particular setting of sleeve 26, toggle link 18—20 will shift to the position shown in Figure 3, the movement of link 18 being limited by bolt 15a engaging the end of slot 24. This toggle link movement can be readily felt and heard by the operator of the tool and he will know that the indicated torque has been reached. The wrench 10 can however be given further tightening rotation if the operator particularly desires to do this, however he will be aware that this applied torque is in excess of that indicated by the setting of sleeve 26. It will be seen from Figure 3 that pin 19 which connects link 18 and link 20 does not move to the center line of spindle 16 and pin 22 and therefore upon release of the applied torque the toggle link will be sprung back to the position shown in Figure 1.

While in the foregoing there has been shown and described the preferred form of this invention, it is to be understood that minor changes in the details of construction, combination and arrangement of parts may be resorted to without departing from the spirit and scope of the invention as claimed.

I claim:

1. In a torque wrench of the class described, a hollow shell open at its ends and at one of its sides, a cover plate closing the open side, several bolts passing through the shell removably securing said cover plate in place, a transverse tool spindle mounted in one end of the shell, an arm extending inwardly of the shell from said spindle, a tubular body having an end secured in the other end of the shell, a reciprocating stem within said body, a cylindrical head carried at one end of said stem and having a reduced portion projecting into the shell, a pair of laterally disposed links pivotally connected with one of said bolts at one of their ends and at opposite sides of said reduced portion, a second pair of links pivotally connected at one of their ends at opposite sides of said reduced portion commonly with the first pair of links and at their other ends with and at opposite sides of the free end of said arm, said arm and said links constituting a form of toggle, a sleeve, constituting a handle, telescoped on the other end of said body and in threaded engagement therewith, a compression spring within said body and encircling said stem with one end bearing against said head, an adjustable member, constituting a seat for the opposite end of said spring, within the other end of said body and having threaded engagement with the outer end of said sleeve, so that by reversely turning the latter relatively to the body, the compression of the spring will be correspondingly varied, and cooperative means mounted on said body and said sleeve for locking the latter against relative turning movements with respect to the body.

2. The invention as defined in claim 1, with the said locking means comprising an annular cam element mounted for turning movements on the inner end of said sleeve, the inner end of said sleeve having a pair of oppositely disposed longitudinal slots underlying said cam element, a roller engaged in each of said slots and having contact with the surface of said body, and an adjustable stop collar mounted on said body in abutted relation with respect to the adjacent ends of said sleeve and the cam element.

*3. In a torque wrench, a hollow shell, a spindle extending through the shell at a position near the front of the shell, a pin extending through the shell at a rearward position with respect to the spindle, an arm disposed within the shell in pivotal relationship to the spindle and extending rearwardly in the shell, at least a first link coupled at opposite ends to the pin and to the rearwardly disposed end of the arm for pivotal movements relative to these members, means extending from the pivot pin to the wall of the shell in pivotal relationship to the pin for providing a constraining action to maintain the movements of the pin in a particular direction within the shell, and means including a spring disposed in constrained relationship for the exertion of a force against the pin to control the torque required to pivot the arm and the first link.*

*4. In a torque wrench, a hollow shell, a tool spindle mounted in one end of the shell, a pivot pin disposed at a rearward position with respect to the tool spindle, toggle members mounted on the spindle and the pivot pin and coupled to one another to provide a pivotal movement upon the exertion upon the spindle of a torque greater than a particular value, a body member disposed in telescopic relationship to the shell, a sleeve disposed in telescopic relationship to the body member, means disposed within the body member and the sleeve for providing an adjustable force for restraining the pivotal movements of the toggle members for torques exerted on the spindle of a value less than the value of the adjustable force, and means disposed on the body member and the sleeve for locking the sleeve to the body member in one position of the locking means to prevent any adjustment of the restraining force and for unlocking the sleeve from the body member in a second position of the locking means to provide for an adjustment in the restraining force.*

*5. In a torque wrench, a hollow shell, a tool spindle mounted in one end of the shell, an arm extending inwardly in the shell from the spindle, a pivot pin extending through the shell at an interior position with respect to the tool spindle, a head projecting into the shell from the other end of the shell for coupling to the pivot pin, at least a first link pivotally coupled to the pivot pin at one end and extending to the wall of the shell at the other end to control the movements of the pivot pin, at least a second link pivotally coupled at one end to the pivot pin and at the other end with the inwardly disposed end of the arm to form a toggle arrangement with the arm, a tubular body member disposed in telescopic relationship to the hollow shell at the inward end of the shell, a sleeve disposed in telescopic relationship to the body member, a member adjustably positioned within the sleeve and extending into the body member, means disposed in co-operative relationship with the body member and the sleeve for locking the adjustable member against any change in positioning, and a spring disposed in constrained relationship between the head and the adjustable member to control the force required to pivot the second link and the arm constituting the toggle arrangement.*

*6. In a torque wrench, a hollow shell, a spindle extending through the shell at a position near the front of the shell, a pivot pin disposed within the shell at a rearward position with respect to the spindle, a second pivot pin disposed within the shell at a rearward position with respect to the spindle and the first pin, an arm disposed at opposite ends on the spindle and the first pin for pivotal movements with these members, at least a first link disposed at opposite ends on the first and second pins for pivotal movements with the pins, means disposed on the second pin at one end and in coupled relationship to the shell at the other end to control the direction of movement of the second pin within the shell, a head coupled to the second pin at one end and extending rearwardly in the shell form the pin, means adjustably positioned with respect to the shell, and means including a spring disposed between the head and the adjustable means and provided with a constraint dependent upon the positioning of the adjustable means to control the force required for the arm and the first link to become pivoted to a position indicating the exertion on the wrench of a torque greater than a particular value.*

*7. In a torque wrench, a hollow shell, a tool spindle mounted in one end of the shell, a pivot pin disposed at a rearward position with respect to the tool spindle, toggle members mounted on the tool spindle and the pivot pin and coupled to each other to provide a pivotal movement upon the exertion upon the spindle of a torque greater than a particular value, a body member disposed in telescopic relationship to the shell, a sleeve disposed in telescopic relationship to the body member, a seat adjustably positioned within the threaded portion of the sleeve, means including a spring disposed in co-operative relationship with the seat to press against the pivot pin for restraining any pivotal movements of the toggle members for torques less than a particular value, the particular value being adjustable in accordance with variations in the positioning of the seat, and means including a collar rotatably mounted on the sleeve and having at least one cam surface disposed in co-operative relationship with the sleeve for providing a locking relationship between the sleeve and the body member upon a rotation of the collar in one direction and for providing a release of the locking relationship upon a rotation of the collar in an opposite direction.*

*8. In a torque wrench, a hollow shell, a tool spindle pivotally mounted in one end of the shell, an arm carried at one end on the tool spindle for pivotal movement and extending interiorly from the spindle, a pivot pin mounted within the shell at an interior position with respect to the spindle, at least one link carried at one end on the pin for pivotal movement and coupled to the arm at the other end for pivotal movement, means extending from the pivot pin to the wall of the shell in pivotal relationship to the pin to provide a toggle action with the link and the arm, means including a body member and a sleeve disposed in telescopic relationship to each other and to the shell, a head carried at one end on the pivot pin and extending interiorly from the pin, a seat adjustably positioned within the sleeve, a spring disposed in constrained relationship within the body member between the head and the seat to impose a force against the pivot pin and the toggle arrangement for the prevention of a pivotal actuation of the toggle arrangement for torques,*

*less than a particular value, and means including a collar disposed on the sleeve for locking the seat in a particular position after adjustment.*

*9. In a torque wrench, a hollow shell, a first pivot pin disposed within the shell at a position near the front of the shell, a second pivot pin disposed within the shell at a rearward position with respect to the first pin, a third pivot pin disposed within the shell at a rearward position with respect to the first and second pins, an arm mounted at opposite ends on the first and second pins for pivotal movement, at least one link mounted on the second and third pins for pivotal movement, means disposed between the third pivot pin and the wall of the shell for pivotal movement to provide a toggle arrangement with the arm and the link, means for limiting the pivotal movement of the members constituting the toggle arrangement, a head disposed in contiguous relationship to the third pin to provide for the imposition of a force against the pin and a pivotal movement of the members constituting the toggle arrangement, a seat adjustably positioned with respect to the pivot pins, a spring disposed in constrained relationship between the head and the seat to prevent any pivotal movement of the members constituting the toggle arrangement until the exertion of a torque greater than the constraining force provided by the spring, and means for locking the seat against any change in position after adjustment.*

*10. In a torque wrench, a hollow shell, a tool spindle mounted in one end of the shell, a pivot pin disposed in the shell at a position interior to the spindle, means including an arm and at least one link respectively disposed at opposite ends on the spindle and the pivot pin and coupled to each other at an intermediate position for movement at the intermediate position in a direction transverse to the line between the spindle and the pivot pin upon the exertion of a sufficient torque against the spindle, means coupled to the pivot pin and disposed in co-operative relationship with the shell to provide a bracing action upon a pivotal movement of the arm and the link, a body member disposed in telescopic relationship with the shell, a sleeve disposed in telescopic relationship with the body member, a seat adjustably positioned within the sleeve, a head disposed in co-operative relationship with the pivot pin, a spring disposed in constrained relationship between the seat and the head to exert a force for restraining the pivotal movements of the arm and the link for torques less than a particular value, and co-operative means mounted on the body member and the sleeve for locking the sleeve against relative turning movements with respect to the*

*body to prevent an adjustment in the positioning of the seat and to prevent any variations in the constraint imposed by the spring.*

*11. In a torque wrench, a hollow shell, a tool spindle mounted in one end of the shell, a first pivot pin disposed within the shell at a rearward position with respect to the tool spindle, a second pivot pin disposed within the shell at an intermediate position between the first pivot pin and the tool spindle, an arm disposed at opposite ends on the tool spindle and the second pin for pivotal movement, at least one link disposed at opposite ends on the first and second pins for pivotal movement, means disposed in co-operative and pivotal relationship with the first pin and the shell for forming a toggle arrangement with the arm and the link, a body member disposed in telescopic relationship with the shell, a sleeve disposed in telescopic relationship with the body member, means including a seat adjustably positioned within the sleeve and a spring constrained against the first pivot pin by the seat to oppose any pivotal movements of the toggle arrangement for torques less than a value related to the positioning of the seat, there being at least one slot in a portion of the sleeve disposed in telescopic relationship to the body member, a roller disposed in the slot in the sleeve, and a collar mounted on the sleeve and having at least one inner surface cammed to lock with the roller upon an angular movement of the collar in one direction for a prevention of the adjustment of the seat and to release the sleeve and the body member upon an angular movement of the collar in an opposite direction for the provision of an adjustment in the disposition of the seat.*

References Cited in the file of this patent or the original patent

UNITED STATES PATENTS

| | | |
|---|---|---|
| 1,519,800 | Rifflard | Dec. 16, 1924 |
| 1,574,865 | Boykin | Mar. 2, 1926 |
| 1,860,871 | Ponliot | May 31, 1932 |
| 2,201,918 | Petersen | May 21, 1940 |
| 2,362,149 | Nelson | Nov. 7, 1944 |
| 2,365,486 | Morris | Dec. 19, 1944 |
| 2,400,205 | Livermont | May 14, 1946 |
| 2,553,311 | Greer | May 15, 1951 |
| 2,556,587 | Keen | June 12, 1951 |
| 2,667,800 | Garwood | Feb. 2, 1954 |

FOREIGN PATENTS

| | | |
|---|---|---|
| 109,874 | Australia | Feb. 20, 1940 |